(12) United States Patent
Nakamura

(10) Patent No.: US 11,750,762 B2
(45) Date of Patent: Sep. 5, 2023

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Takashi Nakamura, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 457 days.

(21) Appl. No.: 16/816,502

(22) Filed: Mar. 12, 2020

(65) Prior Publication Data

US 2021/0029269 A1     Jan. 28, 2021

(30) Foreign Application Priority Data

Jul. 26, 2019 (JP) ................. 2019-137611

(51) Int. Cl.
*H04L 29/06* (2006.01)
*H04N 1/44* (2006.01)
(Continued)

(52) U.S. Cl.
CPC ......... *H04N 1/4433* (2013.01); *H04L 63/083* (2013.01); *H04W 8/005* (2013.01); *H04W 12/069* (2021.01); *H04W 60/00* (2013.01)

(58) Field of Classification Search
CPC ............ H04L 41/0813; H04L 41/0806; H04L 41/084; H04L 67/51; H04L 61/50
See application file for complete search history.

(56) References Cited

U.S. PATENT DOCUMENTS

2010/0309499 A1* 12/2010 Ebi ................. G06F 3/1257
                                                     358/1.13
2014/0268230 A1*  9/2014 Kosuda ........... G06F 3/1287
                                                     358/1.15
(Continued)

FOREIGN PATENT DOCUMENTS

JP       2004-005437 A    1/2004
JP       2004-015210 A    1/2004
(Continued)

OTHER PUBLICATIONS

Feb. 7, 2023 Notice of Reasons for Refusal in Japanese Patent Application No. 2019-137611.

*Primary Examiner* — Kostas J Katsikis
(74) *Attorney, Agent, or Firm* — Oliff PLC

(57) ABSTRACT

An information processing apparatus includes a transmitter, a receiver, an acquiring unit, and a registering unit. The transmitter transmits network identification information of a newly-connected network to a management apparatus via a wireless communication line when a network to which the information processing apparatus is connected is changed. The receiver receives address information registered in correspondence with the transmitted network identification information from the management apparatus via the wireless communication line. The acquiring unit acquires setting information from an apparatus accessed by using the address information received by the receiver. The registering unit registers the setting information acquired by the acquiring unit as setting information of the information processing apparatus.

16 Claims, 12 Drawing Sheets

(51) Int. Cl.
*H04W 60/00* (2009.01)
*H04L 9/40* (2022.01)
*H04W 8/00* (2009.01)
*H04W 12/069* (2021.01)

(56) References Cited

U.S. PATENT DOCUMENTS

| | | | | |
|---|---|---|---|---|
| 2016/0105406 A1* | 4/2016 | Smith | ............... | H04W 8/26 |
| | | | | 713/171 |
| 2016/0295567 A1* | 10/2016 | Nogawa | ............ | H04W 8/005 |
| 2016/0345269 A1* | 11/2016 | Basehore | ............ | H04W 4/027 |
| 2018/0167271 A1* | 6/2018 | Bower, III | ......... | H04L 41/0886 |
| 2019/0332332 A1* | 10/2019 | Yoshida | ............ | G06F 3/1285 |
| 2020/0293245 A1* | 9/2020 | Tanaka | ............ | G06F 3/1292 |
| 2020/0301630 A1* | 9/2020 | Nakamura | ............ | G06F 3/1292 |

FOREIGN PATENT DOCUMENTS

| | | |
|---|---|---|
| JP | 2004-343420 A | 12/2004 |
| JP | 2015-201798 A | 11/2015 |
| JP | 2019-116791 A | 7/2019 |

\* cited by examiner

FIG. 2

| | APPARATUS ID | ADDRESS INFORMATION |
|---|---|---|
| NETWORK ID: 9C:AE:D3:D7:AE:36 | | |
| MASTER APPARATUS 1 | 10001 | 192.168.1.1 |
| MASTER APPARATUS 2 | 10002 | 192.168.1.2 |
| MASTER APPARATUS 3 | 10003 | 192.168.1.3 |
| NETWORK ID: AC:36:43:CA:AE:25 | | |
| | APPARATUS ID | ADDRESS INFORMATION |
| MASTER APPARATUS 1 | 20001 | 192.168.2.1 |
| MASTER APPARATUS 2 | 20002 | 192.168.2.2 |

FIG. 10

| | | | |
|---|---|---|---|
| NETWORK ID: 9C:AE:D3:D7:AE:36 | | | |
| | APPARATUS ID | ADDRESS INFORMATION | PASSWORD INFORMATION |
| MASTER APPARATUS 1 | 10001 | 192.168.1.1 | 123456 |
| MASTER APPARATUS 2 | 10002 | 192.168.1.2 | 121212 |
| MASTER APPARATUS 3 | 10003 | 192.168.1.3 | 123412 |
| NETWORK ID: AC:36:43:CA:AE:25 | | | |
| | APPARATUS ID | ADDRESS INFORMATION | PASSWORD INFORMATION |
| MASTER APPARATUS 1 | 20001 | 192.168.2.1 | 987654 |
| MASTER APPARATUS 2 | 20002 | 192.168.2.2 | 987789 |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-137611 filed Jul. 26, 2019.

BACKGROUND

(i) Technical Field

The present disclosure relates to information processing apparatuses, information processing systems, and non-transitory computer readable media.

(ii) Related Art

Japanese Unexamined Patent Application Publication No. 2004-015210 discloses a wireless local-area-network (LAN) communication parameter setting device that achieves a shortened setup time for a wireless LAN system by selecting a parameter group of the wireless LAN system to be used based on attribute information of a wireless terminal from preliminarily-stored parameter groups.

Japanese Unexamined Patent Application Publication No. 2004-343420 discloses a network terminal device that acquires and stores identification information of a specific device in a network when the device is to be connected to the network, and that gives a command for starting a service, when the device is connected to any network, only if identification information of that network is stored.

SUMMARY

Aspects of non-limiting embodiments of the present disclosure relate to an information processing apparatus, an information processing system, and a non-transitory computer readable medium in which, even when a connected network is changed, the settings corresponding to the newly-connected network are registerable without requiring a user operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a transmitter, a receiver, an acquiring unit, and a registering unit. The transmitter transmits network identification information of a newly-connected network to a management apparatus via a wireless communication line when a network to which the information processing apparatus is connected is changed. The receiver receives address information registered in correspondence with the transmitted network identification information from the management apparatus via the wireless communication line. The acquiring unit acquires setting information from an apparatus accessed by using the address information received by the receiver. The registering unit registers the setting information acquired by the acquiring unit as setting information of the information processing apparatus.

BRIEF DESCRIPTION OF THE DRAWINGS

An exemplary embodiment of the present disclosure will be described in detail based on the following figures, wherein:

FIG. 2 illustrates an example of master apparatus information stored in a management server;

FIG. 10 illustrates an example of master apparatus information when password information is used;

DETAILED DESCRIPTION

An exemplary embodiment of the present disclosure will now be described with reference to the drawings.

Figure 1:
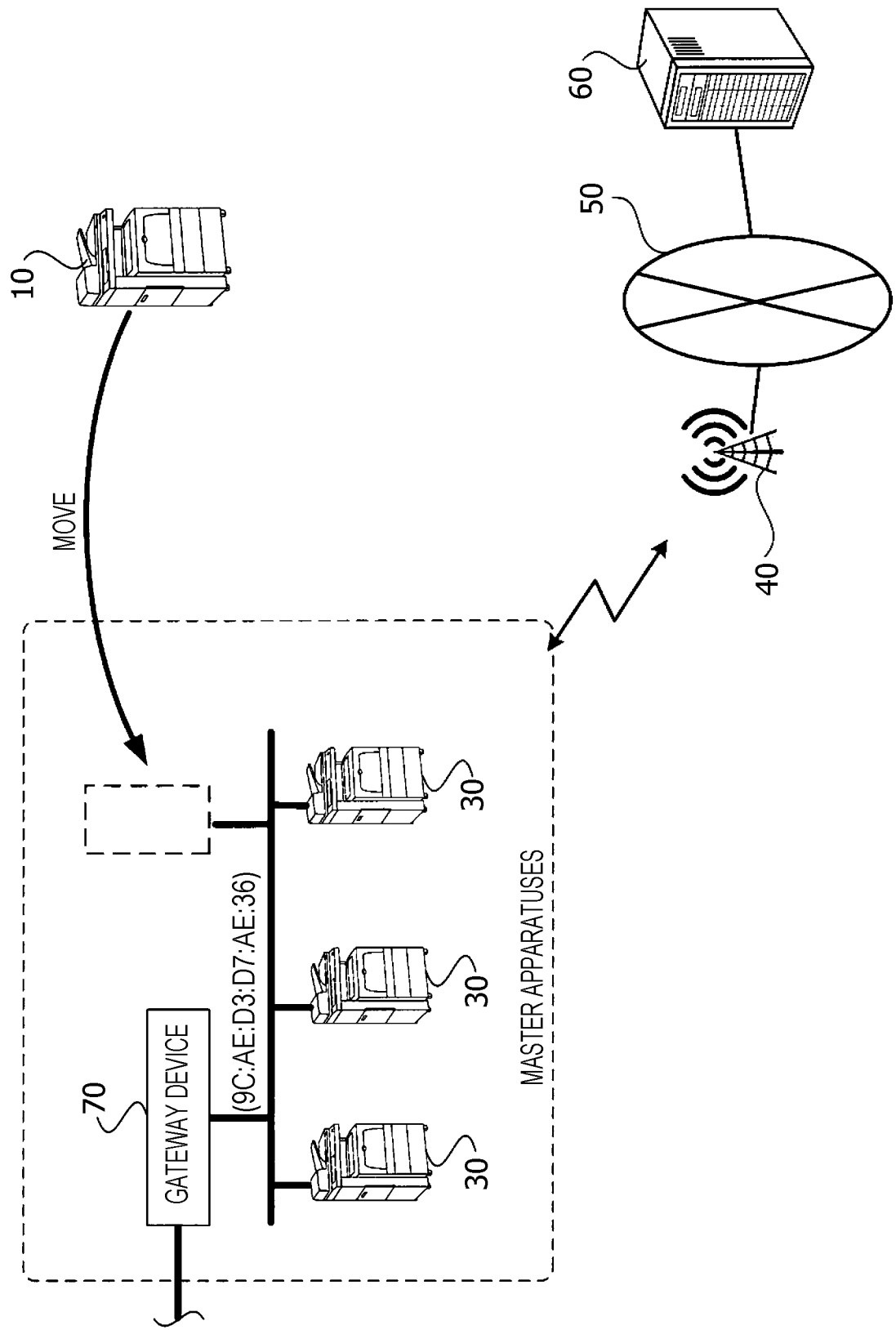
FIG. 1 illustrates a system configuration of an information processing system according to a first exemplary embodiment of the present disclosure.

FIG. 1 illustrates a system configuration of an information processing system according to an exemplary embodiment of the present disclosure.

In the information processing system according to this exemplary embodiment, an image forming apparatus 10 and a management server 60 are connected to each other via a base station 40 and a low-power wide-area (LPWA) communication network 50. The management server 60 stores management information for managing setting information of multiple image forming apparatuses including the image forming apparatus 10.

The image forming apparatus 10 according to this exemplary embodiment is provided with an LPWA communication module for accessing the management server 60 via the LPWA communication network 50.

The following description relates to a case where the image forming apparatus 10 is installed by being moved to an already-established network in the information processing system according to this exemplary embodiment. This network is connected to an external network, such as the Internet, via a gateway device 70.

In this network, multiple image forming apparatuses 30 for which various settings, such as a network setting and a setting for an optional function, have already been completed, are connected. Apparatuses for which the various settings have been completed, such as the image forming apparatuses 30, will be referred to as "master apparatuses".

In a case where such a network is established for each department, various settings to be used only in that department are sometimes configured. Examples include a case where a specific optional function is used by paying a fee to purchase a license key and storing the license key in each apparatus, and a case where scanning resolution and a color mode are unified. Furthermore, if the connected network is changed, it may be impossible to connect to an external network unless a network connection setting corresponding to that network is configured.

Examples of a network connection setting that varies with each network include a default gateway address, an address of a domain name system (DNS) server, and an address of a dynamic host configuration protocol (DHCP) server.

In this case, the image forming apparatus 10 is an apparatus in which a setting for the network shown in FIG. 1 is not configured. For example, the image forming apparatus 10 is an apparatus moved from a completely different network or is a newly purchased and installed apparatus.

The image forming apparatus 10 identifies a network connected thereto by using a network ID (or a network identifier) as network identification information.

A network ID is information from which the network environment is uniquely identifiable. Any type of information may be used as a network ID so long as the network environment is uniquely identifiable from the information. In this exemplary embodiment, an example where a media access control (MAC) address of a gateway device is used as a network ID will be described. For example, the following description relates to a case where the MAC address of the gateway device 70 is the value "9C:AE:D3:D7:AE:36".

In the information processing system according to this exemplary embodiment shown in FIG. 1, the configuration of the image forming apparatus 10 will be described. Likewise, the configuration of each of the image forming apparatuses 30 already set as master apparatuses is identical to the configuration of the image forming apparatus 10.

The management server 60 is a management apparatus that stores master apparatus information by associating a network ID with address information of a master apparatus that retains setting information to be set by an apparatus connected to a network having that network ID.

FIG. 2 illustrates an example of the master apparatus information stored in the management server 60.

In the example of the master apparatus information shown in FIG. 2, information constituted of an apparatus ID and address information and used for accessing a master apparatus is stored for each network ID.

Address information is an internet protocol (IP) address used for accessing a master apparatus, and an apparatus ID is unique apparatus information set for each master apparatus.

In the information processing system according to this exemplary embodiment, such master apparatus information is stored in the management server 60 accessible via the LPWA communication network 50. Thus, by acquiring a network ID from a newly-connected network and transmitting the network ID to the management server 60, the image forming apparatus 10 may acquire master apparatus information corresponding to the transmitted network ID from the management server 60.

Then, the image forming apparatus 10 accesses a master apparatus within the newly-connected network by using the acquired master apparatus information and acquires setting information from that master apparatus, thereby executing a setting process of the image forming apparatus 10.

The reason that the image forming apparatus 10 acquires master apparatus information via the LPWA communication network 50 in the information processing system according to this exemplary embodiment will be described below.

In recent years, a network in which an image forming apparatus is installed may sometimes be disconnected from the Internet for security reasons, or may be non-connectable with the management server 60 due to a firewall provided therebetween. In the first place, when connecting to an external network, such as the Internet, in a newly-connected network, a network connection setting, such as a default gateway address, has to be configured in advance.

In such a case, when the image forming apparatus 10 is connected to the new network, the various settings of the image forming apparatus 10 have to be configured by the user.

Therefore, in the information processing system according to this exemplary embodiment, the image forming apparatus 10 connects to the management server 60 via an LPWA, which is a low-power wide-area wireless communication line, so as to acquire setting information corresponding to the newly-connected network.

This LPWA is also called a low-power wide-area network (LPWAN) and is a wireless communication line not capable of performing high-speed communication but capable of exchanging data with low power over a wide area.

Moreover, this LPWA is a wireless communication line connectable to the management server 60 without configuring a network setting, and is based on a wide-area wireless communication network in which data is exchanged at a communication speed lower than the communication speed in the Internet serving as an external network.

In recent years, such LPWA wireless communication lines are provided as commercial services and may be used with communication fees lower than the contract fees for mobile phone networks.

In the management server 60, setting information itself, instead of master apparatus information, may be stored in correspondence with each network ID. However, since the communication speed in the LPWA wireless communication line is slow, as mentioned above, there is possibly a problem of a long period of time taken for acquiring the setting information from the management server 60 if the data volume of the setting information is large.

In contrast, since master apparatus information, which is information used for accessing a master apparatus, does not have a large data volume, master apparatus information may be stored in the management server 60 in correspondence with a network ID, and the master apparatus information corresponding to the network ID may be acquired from the management server 60. In this case, the problem of the long period of time taken for acquiring the master apparatus information does not occur.

Figure 3:
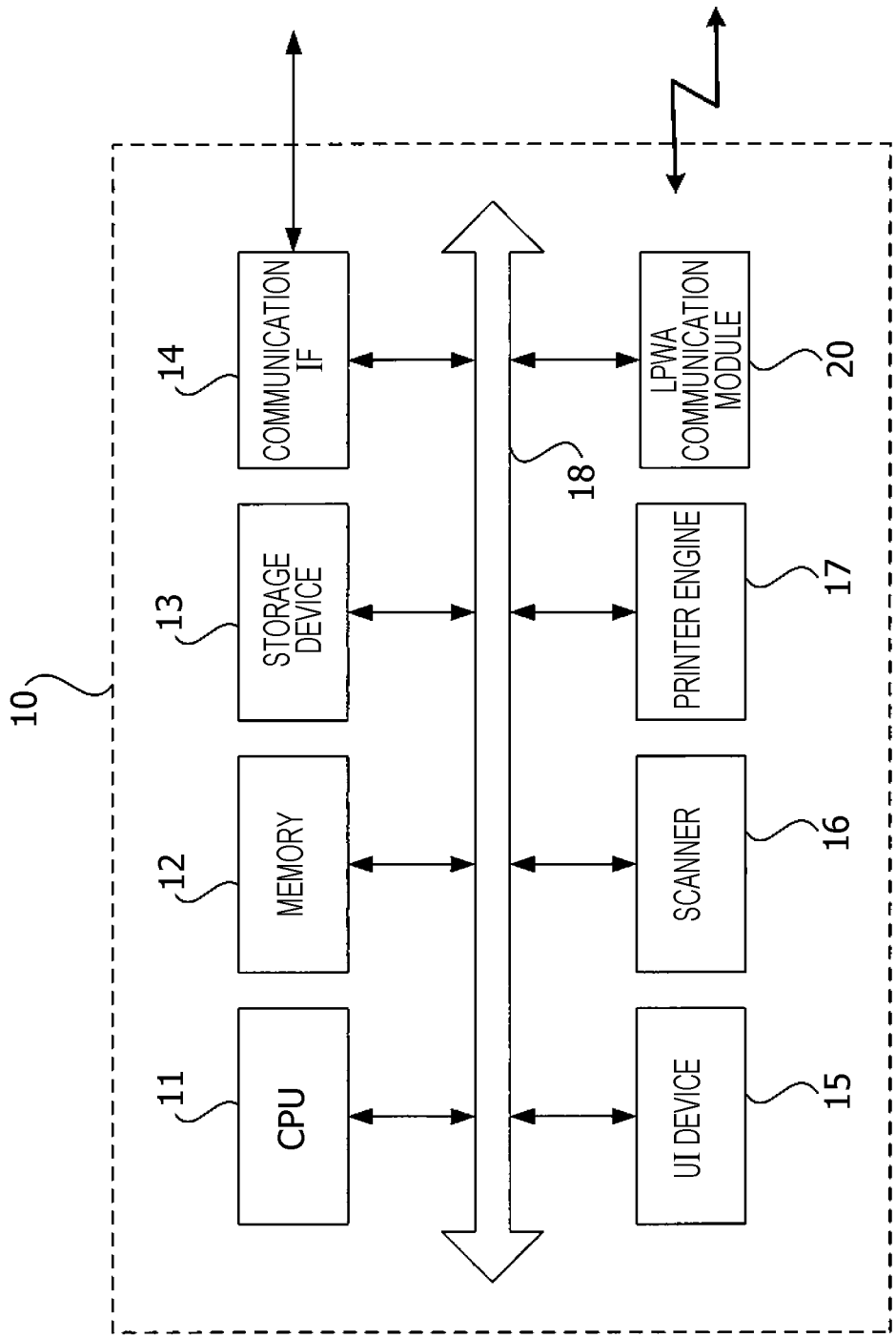
FIG. 3 is a block diagram illustrating a hardware configuration of an image forming apparatus shown in FIG. 1.

FIG. 3 is a block diagram illustrating a hardware configuration of the image forming apparatus 10 shown in FIG. 1.

As shown in FIG. 3, the image forming apparatus 10 has a central processing unit (CPU) 11, a memory 12, a storage device 13, such as a hard disk drive (HDD), a communication interface (IF) 14 that transmits and receives data to and from, for example, another image forming apparatus via a network, a user interface (UI) device 15 that includes a touchscreen or a liquid crystal display and a keyboard, a scanner 16, a printer engine 17, and an LPWA communication module 20. These components are connected to one another via a control bus 18.

The CPU 11 executes a predetermined process based on a control program stored in the memory 12 or the storage device 13, so as to control the operation of the image forming apparatus 10. As an alternative to this exemplary embodiment in which the CPU 11 reads and executes the control program stored in the memory 12 or the storage device 13, the program may be provided to the CPU 11 by being stored in a storage medium, such as a CD-ROM.

Figure 4:
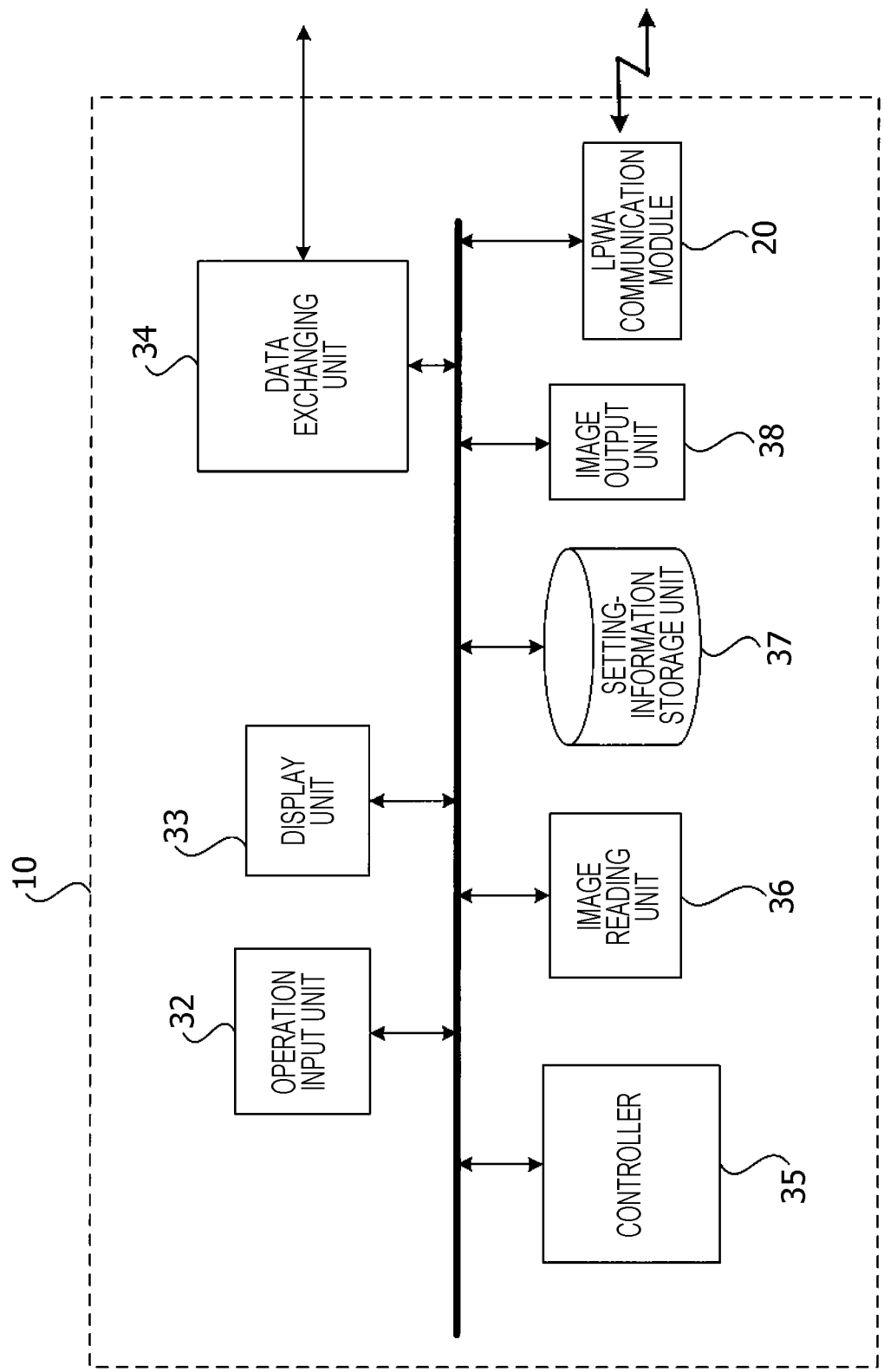
FIG. 4 is a block diagram illustrating a functional configuration of the image forming apparatus shown in FIG. 1.

FIG. 4 is a block diagram illustrating a functional configuration of the image forming apparatus 10 realized by executing the aforementioned control program.

As shown in FIG. 4, the image forming apparatus 10 according to this exemplary embodiment includes an operation input unit 32, a display unit 33, a data exchanging unit 34, a controller 35, an image reading unit 36, a setting-information storage unit 37, an image output unit 38, and the LPWA communication module 20.

The operation input unit 32 receives various types of operations input by the user. The display unit 33 displays various types of information to the user.

The image reading unit 36 reads an image from a set document. The image output unit 38 outputs the image onto a recording medium, such as printing paper.

The data exchanging unit 34 exchanges data with an external apparatus via the Internet.

The setting-information storage unit 37 stores setting information used for configuring various settings of the image forming apparatus 10. In detail, the setting-information storage unit 37 stores connection setting information used for connecting to the aforementioned Internet serving as an external network, setting information used for setting an optional function (or an extension function or an additional function) to an enabled mode or a disabled mode, and setting information used for setting predetermined setting contents in the connected network environment to the image forming apparatus 10.

In a case where the network to which the image forming apparatus 10 is connected is changed, the controller 35 transmits the network ID of the newly-connected network to the management server 60 through the LPWA communication module 20 via the LPWA communication network 50.

When the controller 35 receives master apparatus information corresponding to the transmitted network ID from the management server 60, the controller 35 accesses the master apparatus by using address information contained in the received master apparatus information so as to acquire setting information, and registers the acquired setting information as setting information of the image forming apparatus 10 in the setting-information storage unit 37.

If the network to which the image forming apparatus 10 is connected is changed, the controller 35 disables the network function of the image forming apparatus 10. If master apparatus information containing address information is received from the management server 60, the controller 35 enables only the network connection that uses the address information contained in the received master apparatus information. Then, the controller 35 accesses the master apparatus by using the address information so as to acquire setting information therefrom, and performs control to enable the network connection based on the acquired setting information.

In this exemplary embodiment, in addition to the address information registered in correspondence with the transmitted network ID, the controller 35 receives address information and an apparatus ID from the management server 60 via the LPWA wireless communication line. Then, the controller 35 accesses the master apparatus by using the address information and the apparatus ID received from the management server 60, so as to acquire setting information from the accessed master apparatus.

Although it is possible to access a master apparatus by using address information, such as an IP address, alone, it is possible to confirm that the accessed master apparatus is not the wrong apparatus by accessing the master apparatus using the address information and checking the apparatus ID of the accessed master apparatus.

Furthermore, in addition to the address information and the apparatus ID, the controller 35 may receive address information, an apparatus ID, and authentication information registered in correspondence with the transmitted network ID from the management server 60 via the LPWA wireless communication line.

In this case, the controller 35 accesses the master apparatus by using the received address information, the received apparatus ID, and the received authentication information, so as to acquire setting information from the accessed master apparatus.

The authentication information may be electronic certificate information of the image forming apparatus 10 or may be password information used for accessing the master apparatus storing the setting information.

If there are multiple master apparatus within the network, the controller 35 receives multiple pieces of address information registered in correspondence with the transmitted network ID from the management server 60 via the LPWA wireless communication line.

Then, the controller 35 accesses the master apparatuses sequentially by using higher-ranked address information among the multiple pieces of address information received from the management server 60, so as to acquire setting information, starting from the master apparatus from which the setting information is acquired first.

The setting information acquired by the image forming apparatus 10 from each image forming apparatus 30 serving as a master apparatus includes various types of setting information, such as connection setting information used for connecting to an external network and setting information used for setting an optional function to an enabled mode or a disabled mode. In detail, the setting information used for setting the optional function to the enabled mode or the disabled mode is license key information used for enabling the optional function.

In a case where an optional function is to be set automatically, the controller 35 changes the optional function in an enabled mode to a disabled mode if the network to which the image forming apparatus 10 is connected is changed. Then, the controller 35 sets the optional function to the enabled mode or the disabled mode by using the setting information contained in the setting information acquired from the master apparatus and used for setting the optional function to the enabled mode or the disabled mode.

Figure 5:
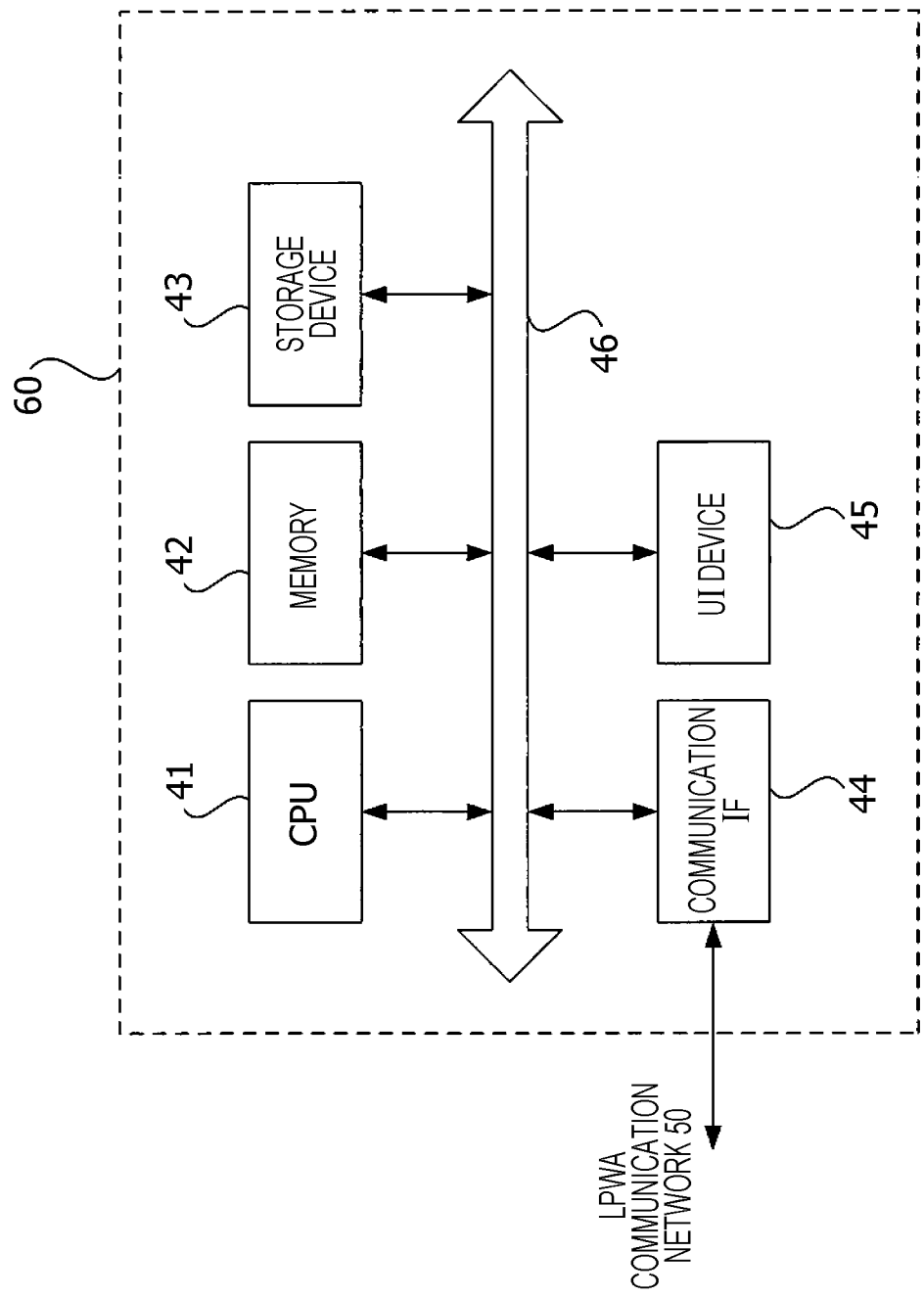
FIG. 5 illustrates a hardware configuration of the management server shown in FIG. 1.

FIG. 5 illustrates a hardware configuration of the management server 60 shown in FIG. 1.

As shown in FIG. 5, the management server 60 has a CPU 41, a memory 42, a storage device 43, such as a hard disk drive, a communication IF 44 that transmits and receives data to and from, for example, the image forming apparatus 10 via the LPWA communication network 50, and a UI device 45 that includes a touchscreen or a liquid crystal display and a keyboard. These components are connected to one another via a control bus 46.

The CPU 41 executes a predetermined process based on a control program stored in the memory 42 or the storage device 43, so as to control the operation of the management server 60. As an alternative to this exemplary embodiment in which the CPU 41 reads and executes the control program stored in the memory 42 or the storage device 43, the program may be provided to the CPU 41 by being stored in a storage medium, such as a CD-ROM.

Figure 6:
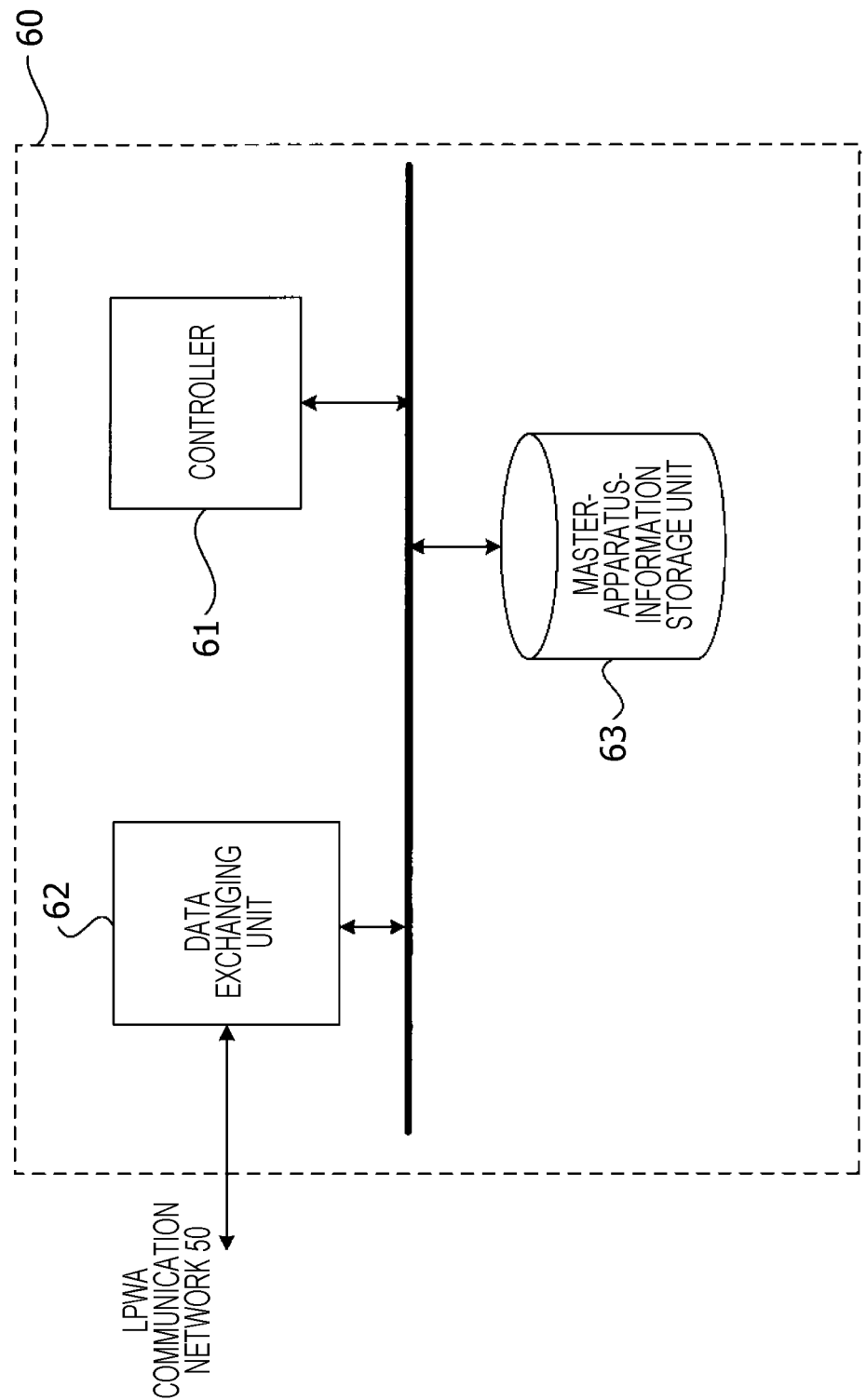
FIG. 6 is a block diagram illustrating a functional configuration of the management server shown in FIG. 1.

FIG. 6 is a block diagram illustrating a functional configuration of the management server 60 realized by executing the aforementioned control program.

As shown in FIG. 6, the management server 60 includes a controller 61, a data exchanging unit 62, and a master-apparatus-information storage unit 63.

The master-apparatus-information storage unit 63 stores the master apparatus information shown in FIG. 2 in correspondence with each network ID.

When the data exchanging unit 62 receives a network ID from the image forming apparatus 10 via the LPWA communication network 50, the controller 61 reads master apparatus information corresponding to the received network ID from the master-apparatus-information storage unit 63, and transmits the master apparatus information to the image forming apparatus 10, from which the network ID is transmitted, via the LPWA communication network 50.

Next, the operation of the image forming apparatus 10 according to this exemplary embodiment will be described in detail with reference to the drawings.

The following description relates to operation performed in a case where the image forming apparatus 10 shown in FIG. 1 is newly connected to a network constituted of the gateway device 70 and the image forming apparatuses 30 serving as master apparatuses.

Furthermore, in the information processing system according to this exemplary embodiment, master apparatus information indicating an access destination of each image forming apparatus 30 serving as a master apparatus has to be registered in advance in the management server 60.

In detail, if the user gives a master registration command to a properly-set image forming apparatus 30 operating without any problems, the image forming apparatus 30 transmits a network ID, an apparatus ID of the image forming apparatus 30, and an IP address of the image forming apparatus 30 to the management server 60 via the LPWA communication network 50.

Then, the management server 60 registers the apparatus ID and the IP address in the master apparatus information that matches the network ID. If the master apparatus information has an identical apparatus ID already registered in the same network ID, the management server 60 overwrites the IP address. If another apparatus ID is registered in the same network ID, the management server 60 registers the apparatus ID as a master apparatus of a subsequent number.

Figure 7:
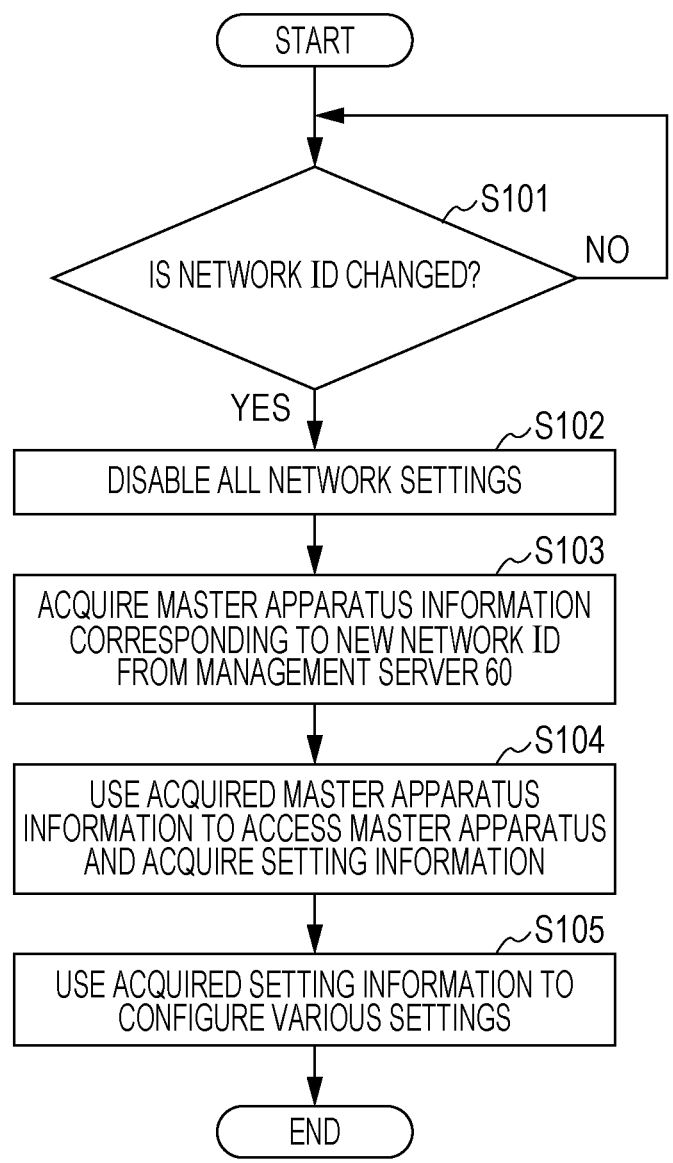
FIG. 7 is a flowchart for explaining operation performed in a case where the image forming apparatus is newly connected in a network after the master apparatus information is registered in the management server.

The following description with reference to a flowchart in FIG. 7 relates to operation performed in a case where the image forming apparatus 10 is newly connected in a network after the master apparatus information is registered in the management server 60 in the above-described manner.

In the image forming apparatus 10, the network ID changes from that of the previously-connected network as a result of the image forming apparatus 10 being connected to the new network. In detail, the controller 35 detects that the network ID has changed to "9C:AE:D3:D7:AE:36".

Then, the controller 35 detects the change in the network ID in step S101, and disables all network settings in step S102.

In step S103, the controller 35 transmits the value "9C:AE:D3:D7:AE:36" as a new network ID from the LPWA communication module 20 to the management server 60 via the LPWA communication network 50, and acquires master apparatus information corresponding to the network ID "9C:AE:D3:D7:AE:36".

Subsequently, after enabling only a function for acquiring setting information from a master apparatus, the controller 35 uses the acquired master apparatus information to access the image forming apparatus 30 serving as a master apparatus and to acquire the setting information therefrom in step S104.

For example, the controller 35 acquires, as the master apparatus information corresponding to the network ID "9C:AE:D3:D7:AE:36", information indicating that the apparatus ID is "10001" and the address information is "192.168.1.1".

Figure 8:
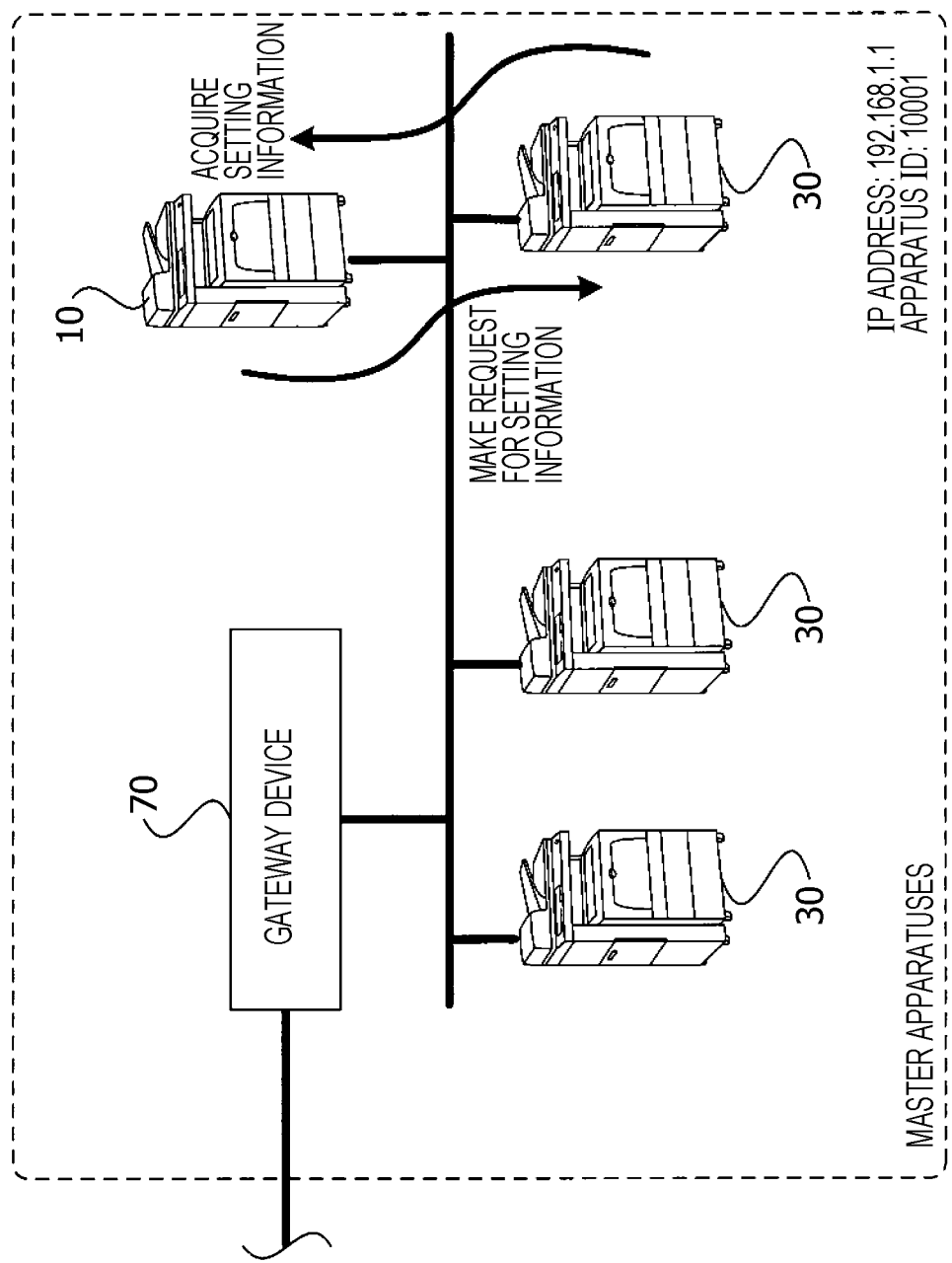
FIG. 8 illustrates how the image forming apparatus makes a request for acquiring setting information to another image forming apparatus serving as a master apparatus and acquires the setting information therefrom.

Then, as shown in FIG. 8, the controller 35 makes a request for acquiring setting information to the image forming apparatus 30 serving as a master apparatus based on the address information and the apparatus ID, and acquires the setting information from the image forming apparatus 30.

Then, in step S105, the controller 35 uses the acquired setting information to configure various settings, such as a network connection setting, whereby the image forming apparatus 10 becomes capable of using a function for connecting to the Internet from the newly-connected network, as well as other functions.

Figure 9:
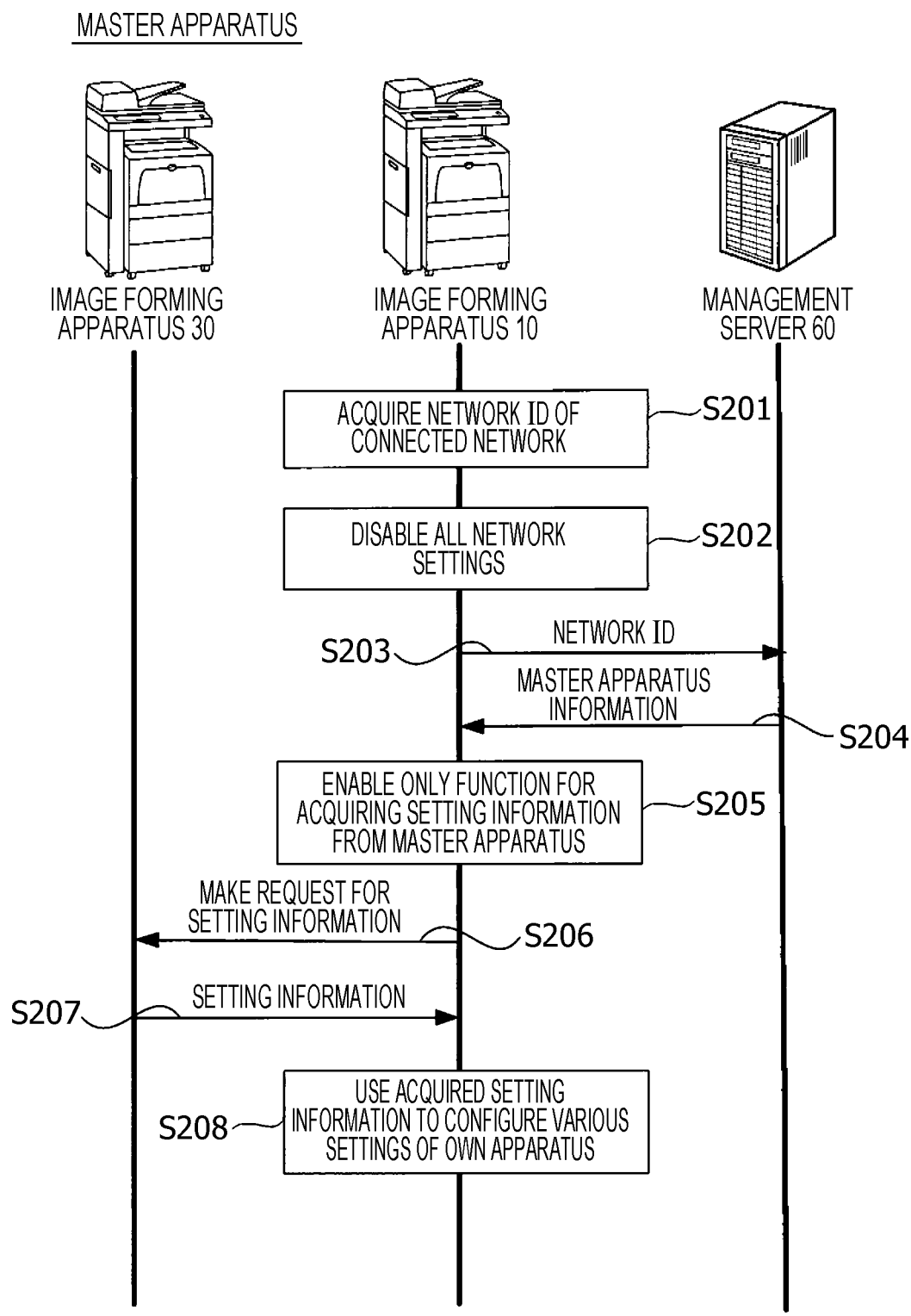
FIG. 9 is a sequence chart for explaining how information is exchanged among the image forming apparatus, the image forming apparatus serving as a master apparatus, and the management server.

Next, the manner in which information is exchanged among the image forming apparatus 10, the image forming apparatus 30 serving as a master apparatus, and the management server 60 will be described with reference to a sequence chart in FIG. 9.

In step S201, the image forming apparatus 10 connected to the new network acquires the network ID of the connected network. Then, in step S202, the image forming apparatus 10 disables all network settings.

Subsequently, in step S203, the image forming apparatus 10 transmits the acquired network ID to the management server 60.

In step S204, the management server 60 reads the master apparatus information corresponding to the received network ID from the master-apparatus-information storage unit 63 and transmits the master apparatus information as a reply to the image forming apparatus 10.

In step S205, the image forming apparatus 10 enables only a function for acquiring setting information from the master apparatus. Then, the image forming apparatus 10 uses the address information contained in the master apparatus information acquired from the management server 60 to access the image forming apparatus 30 serving as a master apparatus and to make a request for the setting information.

In step S207, the image forming apparatus 30 reads the requested setting information from the storage area in the image forming apparatus 30 and transmits the setting information to the image forming apparatus 10.

As a result, in step S208, the image forming apparatus 10 uses the acquired setting information to configure the various settings, such as the network connection setting.

In the above exemplary embodiment, when an image forming apparatus 30 serving as a master apparatus receives a request for setting information from the image forming apparatus 10, the image forming apparatus 30 transmits the setting information unconditionally to the image forming apparatus 10. In such a case, the image forming apparatus 30 transmits the setting information thereof regardless of any apparatus making the request, possibly causing a problem to occur in terms of security.

Therefore, the image forming apparatus 30 serving as a master apparatus may have password information preset therein, and may transmit the setting information only when password information presented by the apparatus making the request for the setting information matches the preset password information.

FIG. 10 illustrates an example of master apparatus information used in such a case. Referring to FIG. 10, master apparatus information stored for each network ID is constituted of an apparatus ID, address information, and password information.

In the case of such a configuration, when the image forming apparatus 10 makes a request for setting information to a master apparatus, the image forming apparatus 10 presents the password information contained in the acquired master apparatus information to the master apparatus. Then, the master apparatus having received the request for the setting information confirms that the presented password information matches the password information stored in the master apparatus, and transmits the requested setting information as a reply to the image forming apparatus 10.

The authentication information to be used for improving security is not limited to password information. Alternatively, when the image forming apparatus 10 makes a request for setting information, the image forming apparatus 10 may present an electronic certificate thereof.

In the exemplary embodiment described above, the image forming apparatus 10 connected to the new network acquires setting information from a master apparatus in the same network. However, if there are no master apparatuses in the same network, the image forming apparatus 10 may acquire setting information from a master apparatus in another network.

Figure 11:
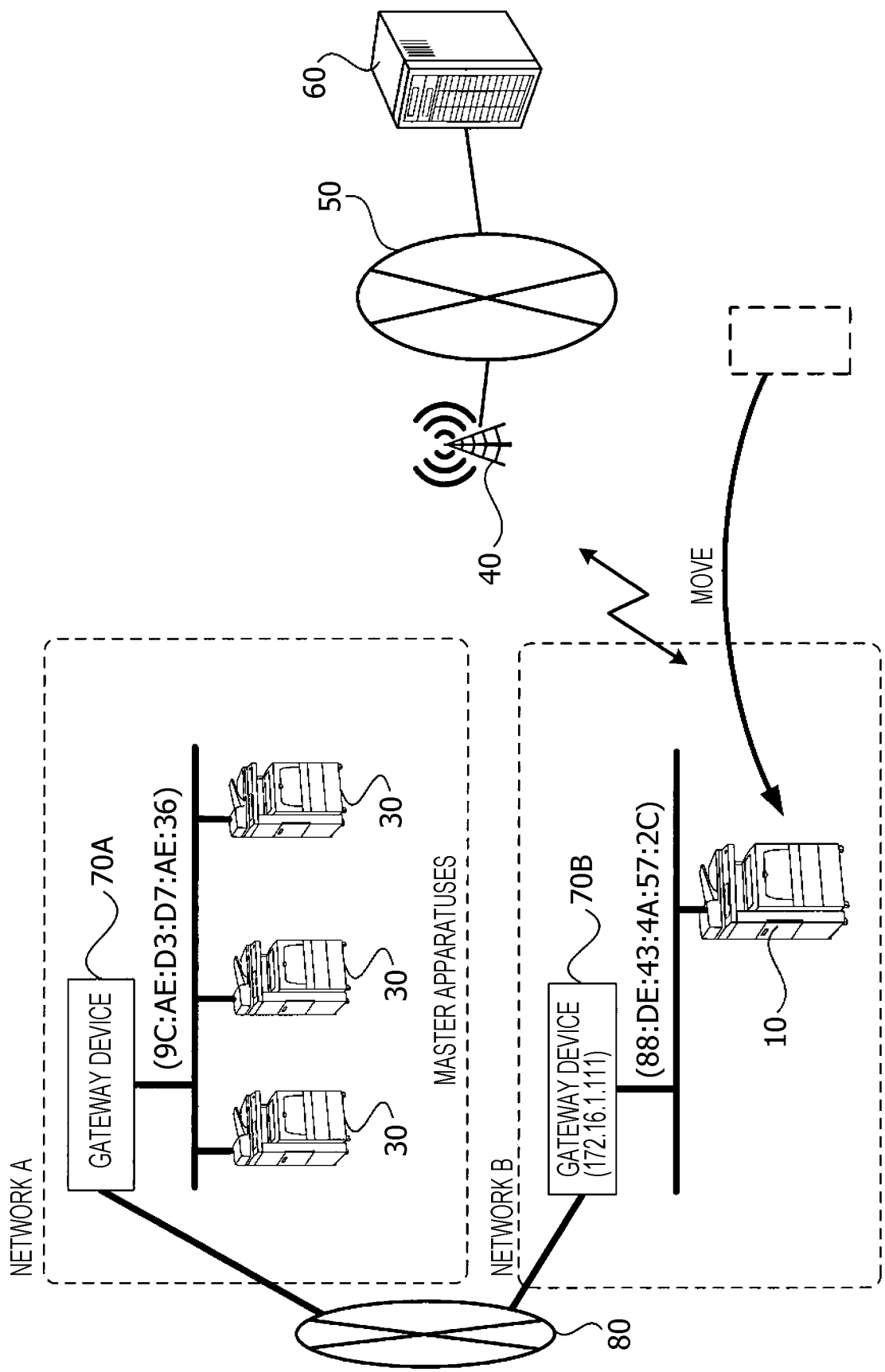
FIG. 11 illustrates how the image forming apparatus acquires setting information from a master apparatus in another network.

The following description with reference to FIG. 11 illustrates how the image forming apparatus 10 acquires setting information from a master apparatus in another network.

In FIG. 11, two networks, namely, networks A and B, are established. The network A is constituted of a gateway device 70A and image forming apparatuses 30, and the network B is constituted of a gateway device 70B.

The following description relates to a case where the image forming apparatus 10 is newly connected to the network B in the network configuration shown in FIG. 11.

Figure 12:
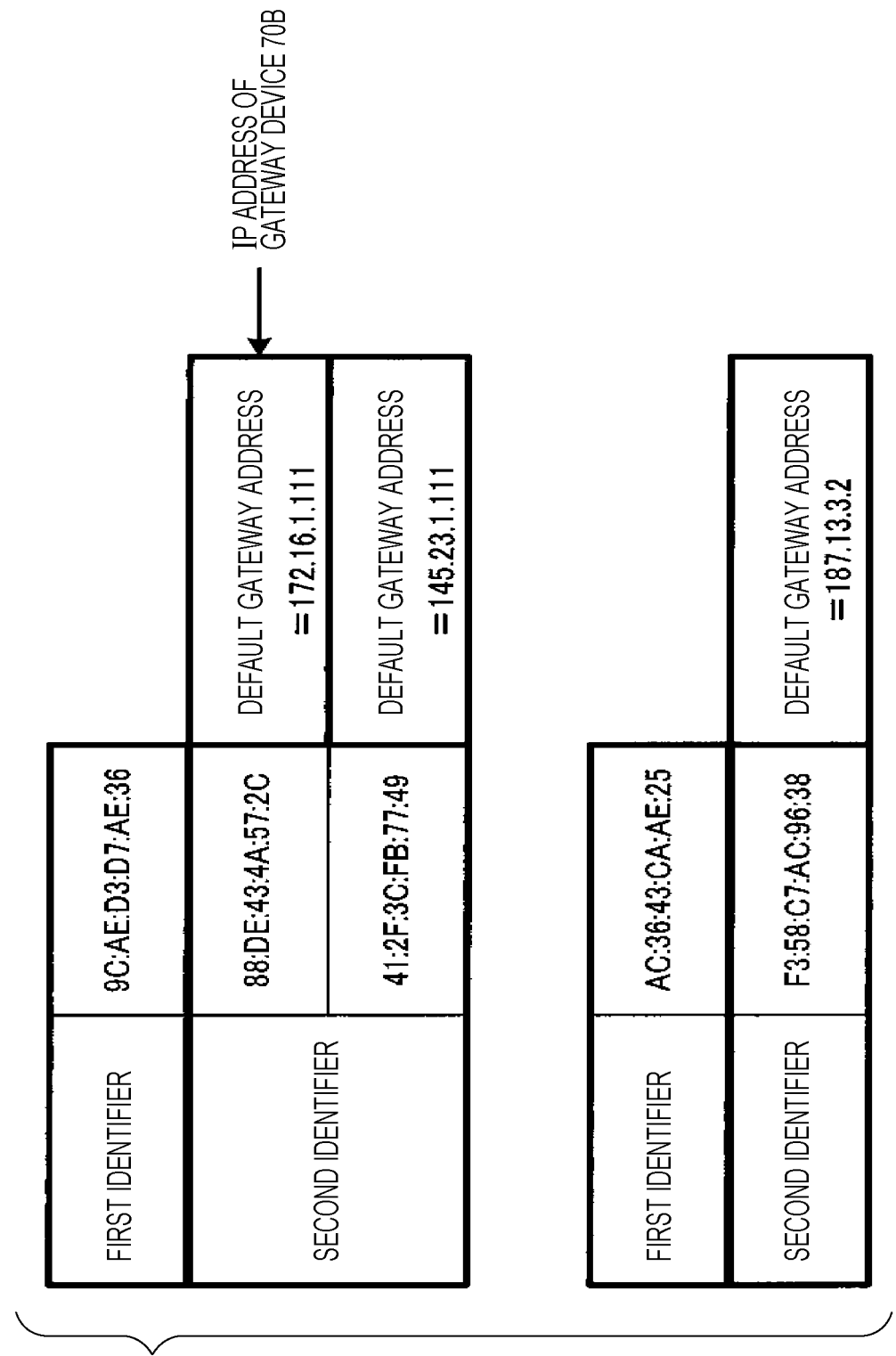
FIG. 12 illustrates an example of a network-identifier relation list stored in the management server.

In the case of such a configuration, for example, a network-identifier relation list shown in FIG. 12 is stored in the management server 60. This network-identifier relation list indicates a group of networks set to acquire setting information from the same master apparatus.

For example, a network ID "9C:AE:D3:D7:AE:36" is set as a first identifier, and two network IDs "88:DE:43:4A:57:2C" and "41:2F:3C:FB:77:49" are associated therewith as second identifiers. This implies that master apparatus information corresponding to the network ID "9C:AE:D3:D7:AE:36" is to be transmitted as a reply to the image forming apparatus 10 presenting the network ID "88:DE:43:4A:57:2C" or "41:2F:3C:FB:77:49".

Specifically, this implies that the image forming apparatus 10 connected to the network having the network ID "88:DE:43:4A:57:2C" or "41:2F:3C:FB:77:49" is set to acquire setting information not from a master apparatus within that network but from a master apparatus within the network having the network ID "9C:AE:D3:D7:AE:36".

Furthermore, in such a configuration, since a master apparatus in another network has to be accessed beyond the current network, it is necessary to ascertain a default gateway address for connecting to a gateway address device of the own apparatus. Therefore, the network-identifier relation list shown in FIG. 12 has stored therein default gateway addresses corresponding to the second identifiers and each used for accessing a gateway device in a network having a network ID registered as a second identifier.

As shown in FIG. 11, the image forming apparatus 10 is newly connected to the network B to acquire the network ID "88:DE:43:4A:57:2C" of the network B, and transmits the acquired network ID to the management server 60. Because the network-identifier relation list shown in FIG. 12 is stored in the management server 60, the management server 60 ascertains that the network ID of the first identifier in which the network ID "88:DE:43:4A:57:2C" is registered as a second identifier is "9C:AE:D3:D7:AE:36". Then, the management server 60 transmits the master apparatus information corresponding to the network ID "9C:AE:D3:D7:AE:36" and the default gateway address registered for the network ID "88:DE:43:4A:57:2C" as a reply to the image forming apparatus 10.

In the network-identifier relation list shown in FIG. 12, the default gateway address "172.16.1.111" registered for the network ID "88:DE:43:4A:57:2C" is an IP address of the gateway device 70B.

With such a configuration, the image forming apparatus 10 receives, from the management server 60 via the LPWA wireless communication line, address information and default gateway address information that are registered in correspondence with the transmitted network ID.

Then, the image forming apparatus 10 uses the received gateway address information to connect to another network different from the network to which the image forming apparatus 10 is connected, so as to acquire setting information from a master apparatus accessed by using the received address information.

In detail, in FIG. 11, the image forming apparatus 10 newly connected to the network B acquires setting information from an image forming apparatus 30 in the network A.

With such a configuration, even when there are no master apparatuses within the same network, the image forming apparatus 10 connected to that network is still capable of acquiring setting information from a master apparatus. Moreover, since a single master apparatus may be set with respect to multiple networks, it is not necessary to register a master apparatus for each network, thereby reducing the time and effort used for registering master apparatuses.

Modifications

In the above exemplary embodiment, when the network to which the image forming apparatus is connected is changed, setting information corresponding to the newly-connected network is acquired from the management server. Alternatively, the present disclosure is applicable to a case where setting information corresponding to a network to which an information processing apparatus other than the image forming apparatus is newly connected is to be acquired from the management server.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program causing a computer to execute a process, the process comprising:
   transmitting network identification information of a newly-connected network to a management apparatus via a wireless communication line when a network to which an information processing apparatus is connected is changed;
   receiving address information registered in correspondence with the transmitted network identification information from the management apparatus via the wireless communication line;
   acquiring setting information from an apparatus accessed by using the received address information;
   registering the acquired setting information as setting information of the information processing apparatus;
   disabling a network function of the information processing apparatus when the network to which the information processing apparatus is connected is changed;
   enabling only a network connection that uses the address information when the address information is received; and
   enabling a network connection based on the acquired setting information when the setting information is acquired.

2. An information processing apparatus comprising:
   a processor programmed to:
   transmit network identification information of a newly-connected network to a management apparatus via a wireless communication line when a network to which the information processing apparatus is connected is changed;
   receive address information registered in correspondence with the transmitted network identification information from the management apparatus via the wireless communication line;
   acquire setting information from an apparatus accessed by using the address information received by the processor;
   register the acquired setting information as setting information of the information processing apparatus;
   disable a network function of the information processing apparatus when the network to which the information processing apparatus is connected is changed;
   enable only a network connection that uses the address information when the address information is received by the processor; and
   enable a network connection based on the acquired setting information when the processor acquires the setting information.

3. The information processing apparatus according to claim 2, wherein the processor is programmed to:
   receive the address information and apparatus identification information from the management apparatus via the wireless communication line, the address information and the apparatus identification information being registered in correspondence with the transmitted network identification information; and
   acquire the setting information from the apparatus accessed by using the address information and the apparatus identification information received by the processor.

4. The information processing apparatus according to claim 1, wherein the processor is programmed to:
   receive the address information, apparatus identification information, and authentication information from the management apparatus via the wireless communication line, the address information, the apparatus identification information, and the authentication information being registered in correspondence with the transmitted network identification information; and
   acquire the setting information from the apparatus accessed by using the address information, the apparatus identification information, and the authentication information received by the processor.

5. The information processing apparatus according to claim 4,
   wherein the authentication information is electronic certificate information of the information processing apparatus.

6. The information processing apparatus according to claim 4,
   wherein the authentication information is password information used for accessing the apparatus retaining the setting information.

7. The information processing apparatus according to claim 2, wherein the processor is programmed to:
   receive a plurality of pieces of the address information registered in correspondence with the transmitted network identification information from the management apparatus via the wireless communication line; and
   acquire the setting information from apparatuses sequentially accessed by using higher-ranked address information among the plurality of pieces of the address information received by the processor.

8. The information processing apparatus according to claim 2, wherein the processor is programmed to:
   receive the address information and gateway address information from the management apparatus via the wireless communication line, the address information and the gateway address information being registered in correspondence with the transmitted network identification information; and
   connect to another network different from the network to which the information processing apparatus is connected by using the gateway address information received by the processor, and acquire the setting information from the apparatus accessed by using the address information received by the processor.

9. The information processing apparatus according to claim 2,
   wherein the setting information is connection setting information used for connecting to an external network.

10. The information processing apparatus according to claim 2,
    wherein the setting information is used for setting an optional function to an enabled mode or a disabled mode.

11. The information processing apparatus according to claim 10, wherein the processor is programmed to:
    change the optional function from the enabled mode to the disabled mode if the network to which the information processing apparatus is connected is changed.

12. The information processing apparatus according to claim 11, wherein the setting information is license key information used for enabling the optional function.

13. The information processing apparatus according to claim 10,
wherein the setting information is license key information used for enabling the optional function.

14. The information processing apparatus according to claim 2,
wherein the wireless communication line is connectable to the management apparatus without a network setting.

15. The information processing apparatus according to claim 14,
wherein the wireless communication line is based on a wide-area wireless communication network in which data is exchanged at a communication speed lower than a communication speed in an external network.

16. An information processing system comprising:
a management apparatus that stores network identification information of a network and address information of an information processing apparatus in correspondence with each other, the information processing apparatus retaining setting information to be set by an apparatus connected to the network; and
the information processing apparatus comprising:
a processor programmed to:
transmit network identification information of a newly-connected network to the management apparatus via a wireless communication line when a network to which the information processing apparatus is connected is changed;
receive address information registered in correspondence with the transmitted network identification information from the management apparatus via the wireless communication line;
acquire setting information from an apparatus accessed by using the address information received by the processor;
register the acquired setting information as setting information of the information processing apparatus;
disable a network function of the information processing apparatus when the network to which the information processing apparatus is connected is changed;
enable only a network connection that uses the address information when the address information is received by the processor; and
enable a network connection based on the acquired setting information when the processor acquires the setting information.

* * * * *